Figure 1:
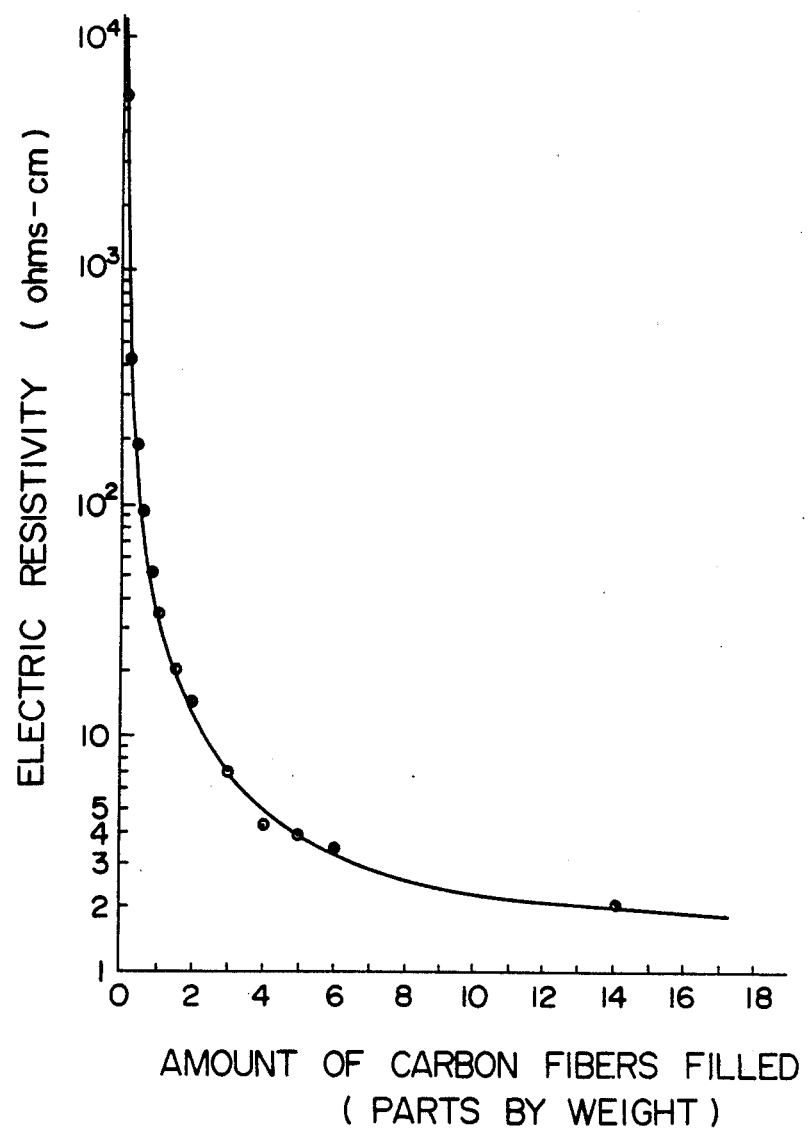

United States Patent [19]

Tanei et al.

[11] 4,301,356

[45] Nov. 17, 1981

[54] HEATING UNIT AND METHOD FOR PRODUCTION THEREOF

[75] Inventors: Tadayoshi Tanei, Nagaokakyo; Minoru Miyamoto, Kusatsu; Akio Ohno, Osaka, all of Japan

[73] Assignee: Sekisui Kagaku Kogyo Kabushiki Kaisha, Osaka, Japan

[21] Appl. No.: 18,323

[22] Filed: Mar. 7, 1979

[30] Foreign Application Priority Data

Mar. 9, 1978 [JP] Japan ................... 53-27329
Aug. 4, 1978 [JP] Japan ................... 53-95545

[51] Int. Cl.$^3$ ............................................. H05B 1/00
[52] U.S. Cl. ........................... 219/213; 219/552; 219/553; 252/506; 252/508; 252/502; 106/97; 106/99; 338/225; 264/61; 264/105; 29/611
[58] Field of Search ............ 252/506, 508, 502; 106/97, 99; 428/902; 219/553, 552, 213; 338/225; 264/61, 65, 104, 105, 333; 29/592 R, 611, 610 R

[56] References Cited

U.S. PATENT DOCUMENTS

| | | | |
|---|---|---|---|
| 3,941,918 | 3/1976 | Nigol et al. | 106/99 |
| 4,111,710 | 9/1978 | Paisaudeau et al. | 106/99 |
| 4,152,168 | 5/1979 | Yano et al. | 106/99 |
| 4,159,302 | 6/1979 | Greve et al. | 106/99 |
| 4,159,911 | 7/1979 | Takazuka | 106/99 |

*Primary Examiner*—J. L. Barr
*Attorney, Agent, or Firm*—Wenderoth, Lind & Ponack

[57] ABSTRACT

Heating unit capable of generating heat upon the passing of an electric current, which comprises a matrix of a hardened hydraulic material and electrically conductive fibers dispersed therein in an amount sufficient to impart electric conductivity and a method for producing the heating unit, which comprises kneading a hydraulic material, water and conductive fibers, optionally molding the kneaded mixture, and then hardening the mixture. The heating unit can be used in various applications such as general household applications, civil engineering applications, industrial applications and railroad applications.

7 Claims, 1 Drawing Figure

HEATING UNIT AND METHOD FOR PRODUCTION THEREOF

This invention relates to an electrically conductive inorganic heating unit which generates heat when placed in an electric field.

Structures comprising a base of an organic or inorganic material and a great quantity of conductive carbon black or the like filled therein to impart electrical conductivity have been known in the past as so-called panel heaters which generate heat over their entire surfaces without breaking of wires. Those having such an organic base material such as rubber and plastics are limited in application because they are flammable and cause a danger of fire. Those having such an inorganic base material as cement decrease in strength because of the filling of a large quantity of fine powder of carbon black, and are not feasible as heaters for practical use. Moreover, since the fine powder of carbon black is bulky and difficult to fill in large quantities in the base material, the manufacturing process for the inorganic panel heater elements becomes complicated.

An electrically conducting composite or sheet composed of carbon fibers and a natural or synthetic resin is also known (see, for example, U.S. Pat. Nos. 3,406,126 and 3,774,299). This composite or sheet has the advantage that because carbon fibers are used as a conductive material, the carbon fibers can impart electric conductivity in a smaller amount than the fine powder of carbon black. However, it still has problems to be solved. For example, the composite or sheet of the prior art is flammable because of its inclusion of natural or synthetic resin, and therefore, finds only limited use. In addition, the carbon fibers, because of their lengths, are not easy to incorporate uniformly, and for uniform filling, a special device such as a plane oriented flight dispersing device is required, as described in Japanese Laid-Open Patent Publication No. 57527/77.

It is an object of this invention therefore to provide a heating unit which is non-flammable, has high strength, and finds a wide range of application, and which can be easily produced.

Another object of this invention is to provide a method for producing the heating unit of the invention by an easy operation.

Other objects of this invention will become apparent from the following description.

We have now found that a product obtained by adding a small amount of conductive fibers such as carbon fibers as a fibrous reinforcing and electrically conductive material to a kneaded mixture of a hydraulic material such as mortar, and hardening the mixture has a low electric resistance effective for heaters, and that the dispersion of the conductive fibers can be performed easily and uniformly without using a special device.

The present invention provides a heating unit capable of generating heat upon the passing of an electric current, said heating unit comprising a matrix of a hardened hydraulic material and electrically conductive fibers dispersed therein in a small amount sufficient to impart electrical conductivity.

The hydraulic material denotes a material which hardens upon reaction with water. Examples include cements such as portland cement, fast-setting cement, heat-setting cement, durable cement and expanded cement, gypsums such as calcium sulfate hemihydrate, α-gypsum and β-gypsum, slaked lime, and calcined dolomite. The cements and gypsums harden upon reaction with water to form calcium sulfate hydrates, calcium aluminate hydrates, and gypsum hydrate. Of these, the cements and gypsums are preferred, and the cements are especially preferred.

Use of heat-setting cement is especially preferred since the molding and hardening of the heating unit can be performed within short periods of time, and the productivity increases. The heat-setting cement is a mixture of alumina cement and portland cement to which calcined gypsum (hemihydrate or anhydrous) and a small amount of lime have been added. By adding water to the heat-setting cement and heating it, the formation of ettringite or the like which exhibits the early strength of the hardened material is promoted.

In the heating unit of this invention, the hydraulic material hardens upon reaction with water, and in the resulting matrix, the conductive fibers are dispersed.

The conductive fibers are dispersed in a small amount sufficient to impart electrical conductivity, and preferably, in an amount of at least 0.1 part by weight per 100 parts by weight of the matrix.

The matrix in this invention denotes a substrate formed by hardening the hydraulic material with water. For example, it consists only of the hydraulic material reacted with water, or additionally contains an aggregate such as sand and pebbles which is bonded firmly by the hydraulic material reacted with water.

Furthermore, the matrix of this invention may contain a filler such as clay or a fibrous reinforcing material such as glass fibers. A matrix containing such an aggregate and a filler is also included within the definition of the matrix in this invention.

The matrix obtained by kneading the hydraulic material with an aggregate such as sand and pebbles and water is preferred because it permits the decrease of the amount of cement and has a high strength, especially a high compressive strength.

Preferred conductive fibers are those which have an electric resistivity of not more than about $10^{-2}$ ohm-cm and are resistant to corrosion by the hydraulic material. Examples are carbon fibers, stainless fibers, whiskers, and brass fibers. Of these, the carbon fibers are preferred. The conductive fibers are dispersed in an unhardened mixture of the hydraulic material, for example a mixture of cement and water, or mortar which is a mixture of cement with sand and water. By hardening the hydraulic material, the fibers are maintained dispersed in the matrix.

When the conductive fibers have a larger length, there can be obtained a heating unit which has a lower electric resistance and can generate heat by application of a lower voltage. Such a heating unit is preferred because the distance between electrodes can be increased. The preferred fiber length is at least 0.3 mm. If the fiber length is too large, however, the dispersion of the fibers in the matrix is non-uniform, and the electric resistivity of the heating element tends to be non-uniform. Accordingly, the conductive fibers used in this invention preferably have a length of 0.3 to 25 mm, more preferably 3 to 10 mm, although the length will vary with the viscosity or flowability of the unhardened kneaded product of the hydraulic material.

To produce a heating unit having a uniform electric resistivity of uniformly dispersing the conductive fibers in the matrix, it is preferred to use conductive fibers having the aforesaid length and a minimum of diameter. Thicker fibers disperse in lower density than thinner fibers even when they are used in the same amount as the thinner fibers. Thus, it is accordingly difficult to obtain a heating element capable of uniformly generating heat, and the amount of the fibers to be filled should be increased. Carbon fibers are most suitable because they can be obtained in small diameters easily and at low cost as compared with the other conductive fibers. Carbon fibers having a diameter of not more than 50 microns are preferred.

The amount of the conductive fibers to be filled in the unhardened kneaded product of the hydraulic material varies depending on the type of the hydraulic material, the type of the conductive fibers, etc, but should be the one which is sufficient to impart electric conductivity so that the resultant heating unit may have a favorable electric resistivity. When the conductive fibers are carbon fibers and the kneaded mixture of the hydraulic material is mortar, the carbon fibers are filled in an amount of preferably about 0.1 to 5 parts by weight, especially about 0.5 to 3 parts by weight, per 100 parts by weight of the matrix. If the amount of the fibers to be filled is too small, the electric resistance of the heating unit varies greatly with a slight difference in the amount of the fibers filled or slight non-uniformity in the dispersed state of the fibers in the matrix, and it is difficult to obtain heating units capable of generating heat to a predetermined temperature. Furthermore, when the amount of the fibers to be filled is too large, it is difficult to disperse them uniformly in the matrix, and larger amounts of the fibers do not bring about a corresponding decrease in the electric resistivity of the heating unit, and result in an increased cost of production.

The method for producing the heating unit provided by this invention is described in detail below.

The heating unit of this invention is produced by mixing the hydraulic material, water, conductive fibers and optionally an aggregate and other additives, optionally molding the mixture, and then hardening the mixture. Preferably, the heating unit of this invention is produced by kneading the hydraulic material and water and optionally an aggregate such as sand and other additives to form an unhardened mixture of the hydraulic material, kneading the mixture further with the conductive fibers, optionally molding the kneaded mixture, and then hardening the mixture. Since wet mortar contains sand, fibers which are bulky and have poor dispersibility in liquids or powders, especially thin carbon fibers, can be dispersed very uniformly by a simple procedure of adding the fibers to the mortar and kneading them. Furthermore, since the carbon fibers can be uniformly dispersed in wet mortar, heating units having a low resistivity can be obtained by using a correspondingly small amount of the carbon fibers. As another advantage, since the amount of the carbon fibers can be small, they scarcely come out on the surface of the heating units.

Molding and hardening of the kneaded mixture containing the conductive fibers may be performed by general molding methods for inorganic materials, such as the casting of the mixture into a mold, pressing, rotation, extrusion, and injection. The unmolded or molded mixture may be hardened. The unmolded hardened mixture is cut suitably to molded articles.

When heat-setting cement is used as the hydraulic material, hardening is carried out under heat. Specifically, when the kneaded mixture of the heat-setting cement is poured into a mold, and heated to 60 to 100° C., it hardens within a short period of time to form a heating unit. Heating may be carried out by external heating with a heater or the like, steam heating, electrical heating, high frequency induction heating. The external heating means heating in a high temperature atmosphere. The steam heating and high frequency induction heating mean heating with steam and high frequency induction, respectively. These methods are well known. The electrical heating refers to a method in which electrodes are set at both ends of the unhardened kneaded mixture, and an electric current is passed across the electrodes to heat the mixture. This method is preferred in the present invention. The electrodes used in this heating procedure may be used as electrodes for the heating unit obtained after hardening. Metal plates, metal meshes, carbon rods, carbon fiber strands, etc. are used as suitable electrodes for heating procedure. Such electrodes are selected depending upon the use, configuration, etc. of the heating unit. The electrodes are arranged so as to generate heat uniformly according to the shape of the kneaded mixture. The number of the electrodes may be at least two, and these electrodes may be connected in series or parallel to each other.

When an electric current is passed through the kneaded mixture, it is heated and hardening sets in. In the hardening reaction, water in the kneaded mixture is used for the hardening of the heat-setting cement. However, because the electric conductivity of the kneaded mixtue is retained by the conductive fibers, uniform heat can be generated stably, and the hardening proceeds to afford a uniform molded article.

In the present invention, the matrix is formed by the hardening of the hydraulic material, and with the lapse of time after hardening, cracks tend to form on the surface. This tendency is somewhat remedied in the present invention by the incorporation of the electrically conductive fibers. The heating unit of this invention may contain dispersed therein other fillers or fibrous reinforcing materials which have good bondability with the hydraulic material, such as calcium carbonate, clay, glass microspheres, perlite, glass fibers, and asbestos. With such a heating unit, the occurrence of cracks is reduced.

When electrodes are provided at both ends of the heating unit so obtained and an electric current is passed across the electrodes, it generates heat uniformly.

Such a heating unit may, for example, be embedded on the job in the walls or floors of iron-reinforced concrete buildings so that it is covered with non-flammable and insulating concrete.

Depending upon the mode of use of the heating unit, it is necessary or preferable to further cover the surface of the heating unit with an insulating coating so as to improve its appearance or insulating property. Thus, the present invention also provides a surface-insulated heating unit comprising the heating of the invention and an insulation coating covering the heating unit.

The surface-insulated heating unit can be produced by coating the hardened heating unit of this invention with an insulation coating, or by coating an unhardened mixture capable of giving the heating unit of this invention with an insulation coating and then hardening the mixture.

Coating of the heating unit of this invention with an insulation agent is carried out, for example, in the following manner.

One method of applying an insulation coating is to coat an insulating varnish on the surface of the heating unit. Since the heating unit is slightly uneven, it is necessary to perform the coating operation with great care so as not to produce pinholes in the coated film.

To perform uniform insulation coating of the heating unit of this invention, it is preferred to employ powder coating or electrostatic coating by utilizing the heat-generating property and electric conductivity of the heating unit.

Powder coating is performed, for example, by a spraying method which comprises electrically heating the heating unit, and spraying an insulating powder paint onto the heating unit, or by a fluidized dipping method which comprises dipping the heating unit kept at an elevated temperature in an atmosphere in which the insulating powder paint is caused to be afloat. The heating temperature of the heating unit can be easily controlled by the voltage to be loaded. The heating unit is electrically heated to fuse the insulating powder paint to the surface of the heating unit, and then the paint is baked so as to form a continuous film of the powder paint. The backing is carried out at a predetermined temperature obtained by further adjusting the voltage to be applied to the heating unit.

When in this manner, the heating unit itself is electrically heated to form an insulating film by the melting and casting of the insulating powder paint, heating can be continued during the coating operation, and the coated film can be made thick and free from pinholes. The rate of heating the heating unit can be increased, and the time required for the coating step can be shortened. Thus, without the need for using a separate heating oven, the coating and baking operations can be carried out by performing one operation of passing an electric current, and the coating operation is very much simplified.

A powder paint composed of an electrically chargeable thermoplastic or thermosetting resin is used as the insulating powder paint. Examples are nylon resins, epoxy resins, polyethylene, polypropylene, polyacrylate resins, fluorocarbon resins, and polyvinyl chloride.

The electrostatic coating is performed by utilizing the electric conductivity of the heating unit, and grounding its electrode portions. When the heating unit is electrostatically coated while grounding its electrode portion, the particles of the insulating paint are negatively charged, and are attracted by the positively charged surface of the heating unit, thus effecting the desired coating. Accordingly, a thick insulation coating can be obtained also at projecting portions or edge portions which are difficult to coat by spray coating or the like. Solvent-base electrostatic paints are preferred as the insulating paint. For example, paints of the epoxy resin, polyacrylate resin or polyester resin type are preferably used.

It is also preferred to use a resin concrete for the insulation coating of the heating unit. The resin concrete is a product obtained by solidifying inorganic aggregate particles such as sand with a thermosetting resin or the like. When the surface of the heating unit is covered with a resin concrete layer, it is easily insulated electrically by the resin concrete layer. The resin concrete layer has high strength, and a high adhesion strength with regard to the surface of the heating unit. The coefficient of thermal expansion of the resin concrete can be easily adjusted to that of the heating unit by varying the composition of the resin concrete. Hence, an insulated heating unit can be obtained which does not undergo delamination at the interface between the surface of the heating unit and the resin concrete layer by heating and cooling cycles of the heating unit.

The heating unit of this invention covered with an insulation coating can also be produced by laminating (a) an unhardened kneaded mixture containing the electrically conductive fibers capable of giving the heating unit of this invention by hardening, or the heating element of this invention which is a hardened product of the unhardened mixture and (b) a kneaded product of a hydraulic material, water glass, a thermosetting resin, or a hardened product of any one of these, at least one of (a) and (b) being in the unhardened state, optionally molding the laminate, and hardening or thermosetting the laminate. The product obtained by this method is preferred because the insulation coating is more firmly bonded to the heating unit. Hardening or thermosetting may be carried out by using the methods described hereinabove with regard to the method of producing the heating unit.

In particular, when the aforesaid unhardened mixture containing the electrically conductive fibers is coated with an unhardened insulation coating material, and the coated mixture is hardened or heat-set, a heating unit having the insulation coating more firmly bonded to the surface can be obtained.

The unhardened insulation coating material may be the one which has hardenability and in the hardened state, possesses insulating property. Examples are thermosetting resins such as epoxy resins and unsaturated polyester resins, and hydraulic materials such as water glass and cement. Of these, cement is especially preferred.

If the same hydraulic material as the matrix of the heating unit is used as the insulating coating material, the insulation coating is bonded to the heating unit much more firmly.

The concurrent use of an electrically insulating fibrous mat in the insulation coating material, increaser the strength of the heating unit, and facilitates the production of the heating unit. According to this preferred embodiment, the heating unit is produced by laminating a kneaded mixture comprising an unhardened hydraulic material, water and electrically conductive fibers and an electrically insulating fibrous mat one on top of another, pressing the laminate from above to impregnate the electrically insulating fibrous mat with the hydraulic material, and hardening the laminate while it is still under pressure or after releasing the pressure. This method affords an insulated heating unit containing an insulation coating comprising the electrically insulating fibrous mat and the hydraulic material impregnated therein and hardened.

Mats of organic materials such as synthetic fiber mat, and mats of inorganic materials such as glass fiber mat or asbestos fiber mat can be used as the electrically insulating fibrous mat if they have electric insulating properties and some extent of strength. In view of the impregnability of the hydraulic material and the reinforcing effect, the glass fiber mat is especially preferred. Examples of the glass fiber mat that can be used are a mat of chopped glass strands, a mat of continuous strands, and roving cloth. Alkali-resistant glass fiber mats are especially preferred because they are not attacked by the hydraulic material such as cement, and retain high strength over long period of time.

The amount of the hydraulic material to be impregnated in the electrically insulating fibrous mat in the insulating layer of this invention is the one sufficient to impregnate the entire fibrous mat fully with the hydraulic material. It is preferred that the electrically insulating fibrous mat should occupy about 5 to 30% by weight of the insulating layer. With this amount, the insulating layer is bonded firmly to the heating unit. The impregnation of the kneaded mixture of the hydraulic material and conductive fibers becomes easy by plating the mixture in as uniform a thickness as possible, then placing the fibrous mat, and pressing the assembly. Provision of the kneaded mixture of the hydraulic material and conductive fibers in a uniform thickness may be carried out by such a method as spraying, casting and extrusion.

The procedure is simplified by providing electrodes in the kneaded mixture comprising the hydraulic material and electrically conductive fibers when the mixture has been placed on a fibrous mat. Metals such as copper, brass and stainless steel, and carbon can be used as electrodes. The electrodes are preferably of a mesh shape because of the good adhesion of such electrodes to the hydraulic material.

The hydraulic material can be impregnated in the electrically insulating fibrous mat by pressing with a press, rolls, etc. Roll pressing is preferred because it can permit continuous impregnation. The pressure of roll pressing varies according to the composition or viscosity of the kneaded mixture, and the type of the electrically insulating fibrous mat. In the case of using cement mortar having ordinary flowability and a glass fiber mat, the impregnation of the mortar is possible at a linear roll pressure of at least about 0.1 kg/cm, and preferably 0.3 to 1 kg/cm. Grooved rolls, rubber rolls, and metallic rolls, etc. may be selected as the rolls according to the composition of the kneaded mixture.

When the electrically insulating fibrous mat is placed on the kneaded mixture of the hydraulic material and the conductive fibers, and the assembly is pressed, only the hydraulic material and water are impregnated into the fibrous mat by the leaking action of the fibrous mat, and the electrically conductive fibers and aggregate, etc. remain compressed underneath. When the entire assembly is hardened at room temperature or at an elevated temperature, a panel heater having the insulating layer formed integrally on one surface of the electrically conductive layer can be obtained easily. Depending upon the ultimate use of the heater, an electrically insulating and thermally insulative layer, or an electrically insulating layer, may be formed on the other surface of the panel heater.

To provide the insulating layer on both surfaces of the panel heater, the kneaded mixture of the hydraulic material and conductive fibers is spread on the electrically conductive fibrous mat, and another electrically insulating fibrous mat was placed on top of it. The entire assembly is consolidated under pressure to impregnate the hydraulic material and water in the upper and lower fibrous mats.

The resulting insulated heating unit comprising a heating layer composed of the matrix of the hydraulic materialy and conductive fibers dispersed therein, and, an insulating layer covering at least one surface of the heating layer, composed of the hardened product of the hydraulic material and the electrically insulating fibrous mat has superior surface insulation, and high strength as a result of the reinforcing of the conductive layer with the conductive fibers, the reinforcing of the insulating layer with the electrically insulating fibrous mat, and the reinforcing of these layers with each other.

Furthermore, according to the method which comprises placing the electrically insulating fibrous mat on the kneaded mixture of the unhardened hydraulic material and conductive fibers, pressing the assembly from above to impregnate the fibrous mat with the hydraulic material and water, and hardening the product, the electrically conductive, heat-generating layer and the insulating layer are formed simultaneously in an integral structure, and thus, the production of the heating unit becomes easy. Furthermore, the heating element has the property of generating heat uniformly because the conductive fibers in the electrically conductive, heating layer are compressed by the leaking action of the electrically insulating fibrous mat and adhere one another densely. Accordingly, even when the amount of the conductive fibers is small, an insulated heating unit having the desired electric resistivity can be obtained.

As stated hereinabove, in the heating unit of this invention, the electrically conductive fibers are dispersed, and embedded, in the matrix formed by the hardening of the hydraulic material. The heating element is non-flammable, and has a uniform electric resistivity which makes the heating element serviceable for practical purposes with a reduced amount of the conductive fibers. Accordingly, the heating unit of this invention has much higher strength than a heating element filled with carbon black and higher than the strength of the base material alone, and its cost is lower.

Low electric resistivity values can be obtained in accordance with this invention is spite of the fact that the amount of the electrically conductive fibers used in the heating unit is smaller than the amount of carbon black used in conventional heating units. It is theorized that since the dispersed and embedded conductive fibers contact one another and the matrix formed by the hardening of the hydraulic material contains bonded water, the conductive fibers are connected to one another through the bonded water, and serve to increase the electric conductivity of the heating unit.

The heating unit of this invention can be used in various applications. For example, it can be used for heating floors, ceilings and walls of buildings by incorporation into these structures, or for thawing the snow by incorporating it into roofs. In general household applications, it can be used as a so-called panel-type heater, and is also useful for heating the seat of a toilet, warming body parts (e.g., as a foot warming device), or for preventing clouding of indoor mirrors. Other applications include civil engineering applications, for example for snow thawing or antifreezing of road surfaces at crossings, parking lots, pedestrians' bridges over main roads, etc., prevention of clouding of road markings, and anti-freezing of water in concrete aging in cold climate; industrial applications such as warming of pipes, tanks, etc.; agricultural and breeding applications such as the heating of greenhouses, swine breeding rooms, and egg incubators; and railroad applications such as thawing and anti-freezing of platforms and railroad crossings for pedestrians.

The following Examples and Comparative Examples illustrate the present invention more specifically.

EXAMPLE 1

Portland cement (38.5% by weight), 38.5% of sand and 23% by weight of water were kneaded, and 2 parts by weight, per 100 parts by weight of the resulting mixture, of carbon fibers (Kureha Chop, a trademark for a product of Kureha Chemical Co., Ltd.; graphitic product having an average fiber length of 5 mm and an average fiber diameter of 14.5 microns) was added. They were uniformly kneaded. The kneaded mixture was poured into a mold having a length of 15 cm, a width of 4 cm and a depth of 1 cm, and allowed to stand for 28 days at room temperature to harden it.

Both end portions of the resulting test piece in its longitudinal direction were shaved, and an electrically conductive resin (as a solution of the resin in a solvent in which silver particles were dispersed) was coated on the shaved surface portions, and dried. The terminals of a resistance meter were connected to the conductive end surface portions, and the electric resistivity of the test piece was measured and found to be 15 ohms-cm.

Then, an a.c. voltage of 20V was applied across the two conductive end surface portions of the test piece. The temperature of the entire surface rose uniformly, and in about 7 minutes, the temperature became constant at 50° C.

EXAMPLE 2

Fast-setting cement (Jet Cement, a trademark for a product of Onoda Cement Co., Ltd.; 29% by weight), 56% by weight of sand and 16% by weight of water were kneaded. One part by weight, per 100 parts by weight of the resulting mixture, of the same carbon fibers as used in Example 1 were added, and they were uniformly kneaded. The resulting mixture was poured into a mold, 15 cm in length, 4 cm in width and 1 cm in depth, provided on a concrete floor, and carbon electrodes were embedded at both ends of the kneaded mixture in the mold in the longitudinal direction. Then, the kneaded mixture was hardened. One day later, the mold was removed, and the hardened mixture was allowed to stand for one week while it was adhered to the surface of the concrete floor. The terminals of a resistance meter were connected to the carbon electrodes at both ends, and the electric resistivity of the product was measured and found to be 50 ohms-cm.

An a.c. voltage of 20V was applied across the carbon electrodes of the above test piece. The temperature of the test piece rose uniformly, and remained at about 40° C.

EXAMPLE 3

Heat-setting cement (TSA, a trademark for a product of Osaka Cement Co., Ltd.; 38.5% by weight), 38.5% by weight sand and 23% by weight of water were kneaded, and 0.6 part by weight, per 100 parts by weight of the resulting mixture, of the same carbon fibers as used in Example 1 were added. They were uniformly kneaded, and the kneaded mixture was poured into a mold having a length of 15 cm, a width of 4 cm and a depth of 1 cm, heated for 30 minutes in an oven at 80° C., to harden it, and then allowed to stand for a week.

The electric resistivity of the resulting sample, measured in the same way as in Example 1, was 92 ohms-cm. When an a.c. voltage of 50V was applied across the two end surfaces of the sample, the temperature of the sample rose uniformly, and remained at about 50° C.

The above procedure was repeated except that the amount of the carbon fibers was varied. The electric resistivities of the products were measured, and the results are shown in Table 1 and FIG. 1 of the accompanying drawings.

TABLE 1

| Run No. | Amount of carbon fibers (parts by weight) | Electric resistance (ohms-cm) |
|---|---|---|
| 1 | 0.05 | $4.1 \times 10^5$ |
| 2 | 0.1 | $5.6 \times 10^3$ |
| 3 | 0.2 | $4.2 \times 10^2$ |
| 4 | 0.4 | $1.9 \times 10^2$ |
| Example 3 | 0.6 | $9.2 \times 10$ |
| 5 | 0.8 | $5.2 \times 10$ |
| 6 | 1.0 | $3.5 \times 10$ |
| 7 | 1.5 | $2.1 \times 10$ |
| 8 | 2.0 | $1.5 \times 10$ |
| 9 | 3.0 | 7.0 |
| 10 | 14 | 2.1 |

It is seen from Table 1 and FIG. 1 that when the amount of the carbon fibers embedded in about 0.1 part or more by weight per 100 parts by weight of the matrix, the electric resistivity becomes practical for heating units; the electric resistivity is most suitable for heating units when the amount of the carbon fibers is within the range of from 0.5 part by weight to 3 parts by weight; and that when it exceeds 5 parts by weight, the electric resistivity scarcely changes.

When a heating unit having such a high electric resistance as seen in Run No. 2 is used, it is necessary to make some adjustment by, for example, broadening the cross sectional area of the heating unit through which to pass an electric current, or shortening the distance between the terminals, or by applying a high voltage.

EXAMPLE 4

Calcium sulfate hemihydrate (74% by weight) and 26% by weight of water were kneaded, and 1 part by weight, per 100 parts by weight of the kneaded mixture, of the same carbon fibers as used in Example 1 was added. They were uniformly kneaded, and the kneaded mixture was poured into a mold having a length of 15 cm, a width of 4 cm and a depth of 1 cm, withdrawn from the mold one hour later, and then allowed to stand for one month to air dry it.

The electric resistivity of the test piece, measured in the same way as in Example 1, was 100 ohms-cm.

COMPARATIVE EXAMPLE 1

A test piece was prepared in the same way as in Example 3 except that 30 parts by weight of conductive carbon black was used instead of the carbon fibers. The resulting test piece had an electric resistivity of 93 ohms-cm.

The above procedure was repeated except that the amount of carbon black was changed. The results are shown in Table 2.

TABLE 2

| Run No. | Amount of carbon black (parts by weight) | Electric resistivity (ohms-cm) |
|---|---|---|
| Comparative Example 1 | 30 | 93 |
| 1 | 20 | $5.5 \times 10^4$ |
| 2 | 10 | $9.5 \times 10^5$ |
| 3 | 1 | $1.5 \times 10^7$ |

The test piece obtained in Comparative Example 1 generated heat upon the application of a low voltage, but the test pieces obtained in Runs Nos. 1 to 3 did not generate heat unless a high voltage was applied. Since the amount of carbon black was large in Comparative Example 1, a long period of time was required for kneading, and the resulting product after hardening have very low strength.

COMPARATIVE EXAMPLE 2

Vinyl chloride resin (100 parts by weight), 50 parts by weight of a plasticizer (DOP), 3 parts by weight of a stabilizer and 0.3 part by weight of a lubricant were heated at 110° C. for 1 hour to cause the plasticizer to be penetrated into the vinyl chloride resin and thus to obtain a vinyl chloride resin compound. Ten parts by weight, per 100 parts by weight of the vinyl chloride resin compound, of the same carbon fibers as used in Example 1 was added, and they were kneaded by a hot roller at 160° C. to form a sheet having a thickness of 1 mm. A test piece, 4 cm in length and 2 cm in width, was cut out from the sheet. An electrically conductive resin was coated on both end surfaces of this test piece in its longitudinal direction, and its electric resistivity was measured, and found to be 15 ohms-cm.

The above procedure was repeated except that the amount of the carbon fibers was varied. The results are shown in Table 3.

TABLE 3

| Run No. | Amount of carbon fibers (parts by weight) | Electric resistivity (ohms-cm) |
| --- | --- | --- |
| 1 | 4 | above $10^6$ |
| 2 | 6 | 230 |
| 3 | 8 | 16 |
| Comparative Example 2 | 10 | 15 |

It is seen from the results obtained that a heating unit having an organic material such as plastics as the matrix increases abruptly in electric resistivity when the amount of the carbon fibers is small, and therefore, is useless in practical application.

The reason for this is not entirely clear. It is presumed however that since the organic matrix such as plastic does not contain bonded water as in the case of the hydraulic material used in the present invention, the amount of carbon fibers embedded decreases, and the contact of the carbon fibers with one another becomes difficult, thus abruptly increasing the electric resistance, resistivity.

EXAMPLE 5

Alumina cement (100 parts by weight), 70 parts by weight of calcined gypsum, 30 parts by weight of calcium hydroxide, 5 parts by weight of the same carbon fibers as used in Example 1, 200 parts by weight of 60-mesh standard sand occurring in Toyoura, Japan, and 100 parts by weight of water were kneaded. The mixture was poured into a mold having a size of 20 cm × 20 cm × 5 cm (depth), and heated at 80° C. It hardened in about 30 minutes. The resultant heating unit removed from the mold had sufficient strength. Both end portions of the heating unit were polished, and coated with a conductive paint. The electric resistance of the heating unit between the two ends was measured, and the inherent volume resistivity of the heating unit was calculated. It was found to be 8 ohms-cm. When a voltage was applied across the two ends, the heating unit generated heat uniformly correspondingly to its volume resistivity.

EXAMPLE 6

One hundred parts by weight of heat-setting cement (TSA, a trademark), 100 parts by weight of 60-mesh standard sand occurring in Toyoura, and 50 parts by weight of water were kneaded to form mortar. One hundred parts by weight of the mortar was kneaded with 1 part by weight of the same carbon fibers as used in Example 1. The kneaded mixture was poured into a platelike mold having a width of 50 cm, a length of 2 cm and a depth of 1 cm. The two end portions of the mold in its longitudinal direction were composed of a stainless steel sheet which was to become an electrode, and the inside surface of the mold excepting the two end portions was made of an insulating material covered with a polyester film.

An a.c. voltage of 30 V was applied across the electrodes at both ends of the mold. At the initial stage of voltage application, the resistance between the electrodes was 43 ohms, and the kneaded mixture hardened in about 43 minutes. After the hardening, the resistance between the electrodes was 52 ohms. The resulting heating unit removed from the mold had uniform strength.

EXAMPLE 7

One hundred parts by weight of heat-setting cement (TSA, a trademark), 100 parst by weight of standard sand occurring in Toyoura, 60 parts by weight of water, and 2.6 parts by weight of carbon fibers were kneaded. The kneaded mixture was poured into a mold having a length of 100 mm, a width of 100 mm and a depth of 10 mm. Electrodes are attached, and the mixture was hardened by heating at 80° C. for 20 minutes to form a heating unit. The heating unit had a resistance of 10 ohms.

When a voltage of 50 V was applied to the heating unit, the temperature of its surface reached 180° C. in 5 minutes. Then, the voltage was adjusted to 40 V, and the heating unit was immediately dipped for 3 seconds in a fluidized bed of an epoxy resin powder paint. The applied paint was then baked for 20 minutes while the voltage was kept at 40 V. The surface temperature of the heating unit was stable at 200° C. The coated film formed on the surface of the heating unit had a thickness of 300 microns. The coated heating unit was dipped in water, and the insulation resistance between the heating unit and water was measured by a 500 V insulation resistance meter and found to be $1 \times 10^6$ megohms. Thus, it was judged that the coated film was free from pinholes.

EXAMPLE 8

One hundred parts by weight of heat-setting cement (TSA, a trademark), 100 parts by weight of standard sand occurring in Toyoura, Japan, 60 parts by weight of water, and 2.6 parts by weight of carbon fibers were kneaded. The kneaded mixture was poured into a mold having a length of 100 cm, a width of 100 mm and a depth of 1 mm. An electrode material consisting of copper wire and a conductive paint coated and dried on the surface of the copper wire was embedded at both end portions of the molded mixture, and the molded product was heated at 80° C. for 20 minutes to harden it and to obtain a heating unit having electrode portions. The heating unit had a resistance of 10 ohms.

The electrode portions of the heating unit were hooked on a grounded wire and suspended in the air. A room temperature-curable epoxy resin paint was electrostatically coated on the entire surface of the heating unit at a voltage of 60 KV using an electrostatic coating machine (REA, made by Ransburg Company) while depositing the paint at a rate of 60 g/min. The efficiency of coating was 60%, and the resulting heating unit had an average coating thickness of 90 microns. The coated heating unit was dipped in water, and the insulation resistance between the heating unit and water was measured by a 500 V insulation resistance meter, and found to be $3 \times 10^3$ megohms. It was judged therefore that the coating was free from pinholes.

When a spray coating was performed on the same heating unit without applying voltage, the efficiency of coating was 40%, and the coating unevenness occurred.

EXAMPLE 9

One hundred parts by weight of portland cement, 100parts by weight of sand having a particle diameter of less than 2 mm, 50 parts by weight of water, 3.5 parts by weight of carbon fibers having a length of 6 mm were kneaded. The kneaded mixture was poured into a mold, and after inserting electrodes, aged for 28 days, and dried at 50° C. for 24 hours to produce a panel heater element having a width of 300 mm, a length of 300 mm and a thickness of 3 mm. The resistance between the electrodes of the panel heater element was 20 ohms.

Twenty parts by weight of an unsaturated polyester resin containing 0.15 parts by weight of methyl ethyl ketone peroxide and 0.15 part by weight of cobalt naphthenate, 22 parts by weight of sand having a particle diameter of 1.8 mm, 47 parts by weight of sand having a particle diameter of 0.2 mm, and 10 parts by weight of calcium carbonate having a particle diameter of about 3 microns were mixed to form an unhardened resin concrete. The surface of the above panel heater element was coated with the unhardened resin concrete to a thickness of 3 mm, and shaken for 10 minutes by a table vibrator, and allowed to stand at room temperature for more than 6 hours to harden the resin concrete layer.

The resulting panel heater had sufficient strength at the resin concrete surface layer. When a voltage of 40 V was applied to the panel heater, the temperature of the panel heater was stable at 60° C. in 20 minutes, thus showing good heat-generating state. The entire surface of the panel heater was covered with a metal foil, and the insulation resistance between the electrodes and the metal foil was measured by a 500 V resistance meter. It was found to be $3 \times 10^3$ megohms.

When an a.c. voltage of 1000 V was applied across the resin concrete layer and the electrodes of the panel heater for 1 minute, no change occurred. Furthermore, the panel heater was dipped in water for 24 hours, and the resistance between the electrodes and water was measured by a 500 V resistance meter. It was 20 megohms. Accordingly, it was judged that the panel heater was free from pinholes and other defects, and was completely insulated electrically.

EXAMPLE 10

Portland cement (29 parts by weight), 57 parts by weight of sand and 14 parts by weight of water were mixed, and kneaded fully by stirring the mixture with a propeller thereby to form an unhardened insulation coating composition. Then, 29 parts by weight of portland cement, 57 parts by weight of sand, 14 parts by weight of water, and 1 part by weight of carbon fibers (graphitic with an average fiber length of 6.0 mm and an average fiber diameter of 12.5 microns) were kneaded to form an unhardened composition for a heating element layer. The insulation coating composition was poured into a mold having an inside dimension of 30 cm $\times$ 30 cm, and the surface of the composition was smoothened. On top of it, a mold frame having an inside diameter of 30 cm $\times$ 30 cm was placed. The heater element composition was poured into this mold to a thickness of 3 mm, and an electrode was embedded at both ends of the poured composition. The electrodes were wire electrodes made by coating a copper wire having a diameter of 1 mm with a conductive paint. The frame was removed, and the insulation coating composition was poured into the mold to a thickness of 3 mm to coat the surface of the heating element layer with the insulation coating composition. The insulation coating composition which had been poured later had a thickness of 6 mm at the edge of the mold contacting the insulation layer intially formed.

The product was allowed to stand in the mold for 3 days to aggregate it, and the hardened molded product was removed from the mold. It was aged for 28 days at room temperature to form a panel heater.

The resulting panel heater had sufficient strength and the heater element layer and the insulation coating were bonded integrally. The electric resistance between the electrodes was 35 ohms. When a voltage of 35 V was applied to the panel heater, the surface temperature became about 40° C., and no electrical leakage to the surface portion was noted. A metal plate, 5 cm $\times$ 5 cm in size, was placed on the surface of the panel heater, and the insulation resistance between the electrodes of the panel heater and the metal plate was measured by applying a voltage of 500 V. It was found to be 2 megohms.

EXAMPLE 11

An insulating coating composition and a heater element composition were poured into a mold in the same way as in Example 10 except that heat-setting cement (TSA, a trademark) was used instead of the portland cement used in Example 10. The mold filled with the compositions was heated for 30 minutes in saturated steam at 80° C. to harden the compositions. The hardened product was removed from the mold, and electrically heated and dried by applying a voltage of 50 V for 1 hour to form a panel heater.

The resulting panel heater had sufficient strength and the heater element layer and the insulation coating were integraly bonded. The electric resistance between the electrodes was 30 ohms. When a voltage of 50 V was applied to the panel heater, the surface temperature reached about 55° C. The insulation resistance was 1.5 megohms.

EXAMPLE 12

A panel heater was produced in the same way as in Example 10 except that the lower layer of the insulation coating was replaced by an asbestos cement plate having a thickness of 3 mm.

The resulting panel heater had sufficient strength, and the asbestos cement plate, the heater element layer and the insulating coating layer were integrally bonded. The electric resistance between the electrodes was 35 ohms, and the insulation resistance was 2 megohms.

EXAMPLE 13

One kilogram of ordinary portland cement, 1 kg of sand, 550 g of water, and 20 g of carbon fibers (with a fiber length of 6 mm and a fiber diameter of 12.5 microns) were put into an Omni-mixer, (made by Chiyo & Gar-bro) and mixed for 5 minutes. The uncured mortar-like mixture was cast on a glass fiber mat (continuous strand mat, 300 g/m$^2$), and its thickness was adjusted to about 2 mm by a knife coater. Two tape-like (1 cm in width) electrodes (brass mesh) were placed on the cast mortar-like mixture with a distance of 50 cm between them. A glass fiber mat (continuous strand mat, 300 g/m$^2$) was placed on top of it. A rubber roll (5 cm in diameter) was rolled against the superimposed assembly at a linear pressure of 0.5 kg/cm through four cycles to impregnate the cement mortar into the glass fiber mats. The laminate was aged for a week at room temperature and under pressure to harden it. A panel heater, 60 cm×60 cm in size, was cut out from the hardened product.

The resulting panel heater had a thickness of 3 mm. The resistance between the electrodes was 20 ohms, and the surface insulation resistance was 5 megohms (measured by a 500 V insulation resistance meter). Lead wires were attached to the electrodes, and an alternate current at 40 V was passed through the panel heater. The panel heater generated heat, and its surface temperature became higher than room temperature (15° C.) by about 7° C.

EXAMPLE 14

One kilogram of heat-setting cement (TSA, a trademark), 1.5 kg of sand, 600 g of water, 200 g of an unsaturated polyester resin, and 15 g of carbon fibers (with a length of 6 mm and a diameter of 12.5 microns) were mixed for 5 minutes in an Omni-mixer. The kneaded mixture was molded in the same way as in Example 13 using a glass fiber mat (chopped strand mat, 3000 g/m$^2$). The molded product was hardened by heating at 80° C. for 30 minutes, and allowed to stand at room temperature for 2 hours. A panel heater, 60 cm×60 cm, was cut out from the product.

The resulting panel heater had a thickness of 3 mm. The electric resistance between the electrodes was 50 ohms, and the surface insulation resistance was 20 megohms.

We claim:

1. A heating unit capable of generating heat upon passing of an electric current therethrough, said heating unit comprising a matrix of a hardened mortar, at least two electrodes set at both ends of the heating unit and electrically conductive carbon fibers dispersed in the matrix, said carbon fibers having lengths of 0.3 to 25 mm, diameters of not more than 50 microns and an electric resistivity of not more than $10^{-2}$ ohm-cm and being in an amount of 0.1 to 3 parts by weight per 100 parts by weight of the matrix.

2. The heating unit of claim 1 wherein the mortar is a mixture of heat-setting cement with sand and water.

3. A method of producing a heating unit capable of generating heat upon the passing of an electric current therethrough, comprising a matrix of a hardened mortar and electrically conductive carbon fibers dispersed in an amount of 0.1 to 3 parts by weight, per weight of the matrix, said method comprising kneading a hydraulic mortar material, water and said conductive fibers, optionally molding the kneaded mixture and the hardening of the mixture, said carbon fibers having lengths of 0.3 to 25 mm, diameters of not more than 50 microns and an electric resistivity of not more than $10^{-2}$ ohm-cm.

4. A method according to claim 3 wherein the mixture is hardened by means of heat.

5. A method according to claim 4 wherein the heat hardening is carried out by passing an electric current through said kneaded mixture or its molded product.

6. A method according to claim 3 wherein the mortar is a mixture of a heat-setting cement with sand and water.

7. A method according to claim 3 which comprises first kneading the hydraulic cement material and water, and the kneading of the mixture further with the electrically conductive carbon fibers.

* * * * *